(12) United States Patent
Timoneda et al.

(10) Patent No.: US 10,819,917 B2
(45) Date of Patent: Oct. 27, 2020

(54) VEHICLE IMAGE PROCESSING SYSTEM

(71) Applicant: FICO MIRRORS, S.A.U., Barcelona (ES)

(72) Inventors: David Gómez Timoneda, Viladecavalls (ES); Frédéric Lorival, Viladecavalls (ES)

(73) Assignee: FICO MIRRORS, S.A.U., Barcelona (ES)

( * ) Notice: Subject to any disclaimer, the term of this patent is extended or adjusted under 35 U.S.C. 154(b) by 0 days.

(21) Appl. No.: 16/037,522

(22) Filed: Jul. 17, 2018

(65) Prior Publication Data

US 2019/0028656 A1 Jan. 24, 2019

(30) Foreign Application Priority Data

Jul. 19, 2017 (EP) .................................... 17382475

(51) Int. Cl.
*B60R 1/00* (2006.01)
*H04N 5/262* (2006.01)
*G06K 9/00* (2006.01)
*H04N 5/225* (2006.01)

(52) U.S. Cl.
CPC ............ *H04N 5/2624* (2013.01); *B60R 1/00* (2013.01); *G06K 9/00791* (2013.01); *H04N 5/2251* (2013.01); *H04N 5/2628* (2013.01); *B60R 2300/00* (2013.01); *B60R 2300/306* (2013.01)

(58) Field of Classification Search
CPC .. H04N 5/2624; H04N 5/2251; H04N 5/2628; B60R 1/00; G06K 9/00791
USPC .......................................................... 348/148
See application file for complete search history.

(56) References Cited

U.S. PATENT DOCUMENTS

| | | | | |
|---|---|---|---|---|
| 2011/0043634 A1* | 2/2011 | Stegmann | ................. | B60R 1/00 348/148 |
| 2012/0169875 A1* | 7/2012 | Matsukawa | ............... | B60R 1/00 348/148 |
| 2014/0347489 A1* | 11/2014 | Kumon | .................... | B60R 1/00 348/148 |

* cited by examiner

*Primary Examiner* — Nguyen T Truong
(74) *Attorney, Agent, or Firm* — Cantor Colburn LLP

(57) ABSTRACT

A vehicle image processing system including a control unit and a display unit. The control unit processes an image of the exterior of the vehicle. The display unit displays at least a part of the image. The control unit operates the display unit in first and second modes. The first mode displays at least a part of the image, and the second mode displays at least first and second adjacent regions. The second region is located at least in a lateral end of the display unit, where in the first region the display unit displays part of the image displayed in the first mode, and in the second region the display unit removes the part of the image not displayed in the first region.

14 Claims, 2 Drawing Sheets

VEHICLE IMAGE PROCESSING SYSTEM

CROSS-REFERENCES TO RELATED APPLICATIONS

This application claims the benefit of European Application No. 17382475.6 filed Jul. 19, 2017, which is incorporated herein by reference in its entirety.

BACKGROUND

The present disclosure relates to a vehicle image processing system, and more particularly, the system is of the kind that displays images of the exterior environment of a vehicle taken by at least one camera mounted on the vehicle.

The known image processing systems comprise the following elements:
- a control unit (ECU), configured to process an image of the exterior environment of the vehicle usually obtained by an image capturing unit, for instance a camera, connectable to the control unit, and
- a display unit, for instance, a screen or a mirror, configured to display the image processed by the control unit.

When the speed of the vehicle increases, objects located in the lateral sides of the displayed image change very quickly causing discomfort to the driver because changes at high speed in pixels of the displayed image disturb the drivers that even direct the gaze involuntarily to the lateral sides of the displayed image.

Therefore, objects located in the lateral sides of the displayed image, which mainly corresponds to the objects located at both sides of the road which remain static while the vehicle is in motion, are disturbing for the driver at high speed.

SUMMARY

A vehicle image processing system, as one non-limiting embodiment of the present disclosure includes a control unit configured to operate a display unit in at least two modes:
- a first mode, where the display unit is configured to display the image or part of the image processed by the control unit, and
- a second mode, where the display unit is configured to display at least a first and a second adjacent regions, the second region located at least in a lateral end of the display unit, where
  - i. in the first region, the display unit is configured to display part of the image processed by the processing unit with the same scale of the image displayed in the first mode, and
  - ii. in the second region, the display unit is configured to remove the part of the image not displayed in the first region corresponding with the lateral end of the imaged displayed in the first mode, so that at least one lateral end of the displayed image is hidden in the second mode.

Therefore, the display unit is configured in the second mode of operation with a second region hiding at least one lateral end of the displayed image of the first mode to the driver's view. Thus, the control unit and the display unit are configured with means for hiding said lateral end part of the displayed image that is not shown to the driver avoiding the disturbing effect that quick changes in the displayed images may cause to the driver. In fact, the lateral end of the image of the first mode of operation is not displayed in the second mode such that said lateral end is removed to the driver's view.

The means that the system may comprise to hide, at least, the lateral ends of the displayed image of the first mode, could be the covering of said lateral end with a dark area, for instance, a monochromatic area obtained by superimposing a square of a black, grey or similar uniform color or by cropping said lateral end from the image among other possibilities to obtain said monochromatic dark area.

The vehicle image processing system therefore hides, for instance, with a black or grey square, the section of the displayed image that suffers rapid changes and can therefore be considered as useless information disturbing the driver. As a consequence, the field of view (FOV) is reduced, that is, the captured area on the camera's imager but, however, since the scale of the image is not modified, it does not affect the object size perceived by the driver preventing additional discomfort to the driver, thus being one of the advantages of the present disclosure.

The foregoing features and elements may be combined in various combinations without exclusivity, unless expressly indicated otherwise. These features and elements, as well as the operation thereof, will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

The display unit (1) of the vehicle image processing system can be located anywhere in the vehicle, for instance, on the dashboard, in the rear view mirror or in any other type of screen that is able to represent an image (2), mainly a digital image, taken by an image capturing unit and that is viewable by the driver. Equally, the image capturing unit could be located, for instance, in the rear part of the vehicle, in the front part of the vehicle or in one lateral side providing a view of the exterior environment of the vehicle.

In one embodiment, the driver could activate or deactivate the second display mode and could decide in which situations the second display mode would be activated, for example, at a certain vehicle speed.

Figure 1:
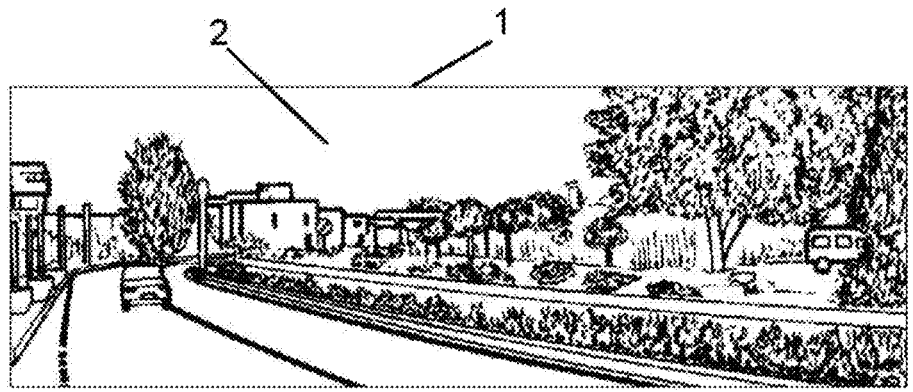
FIG. 1 shows an embodiment of a display unit, specifically a side mirror, showing an image captured by the capturing unit and operating in the first mode.
Figure 2:
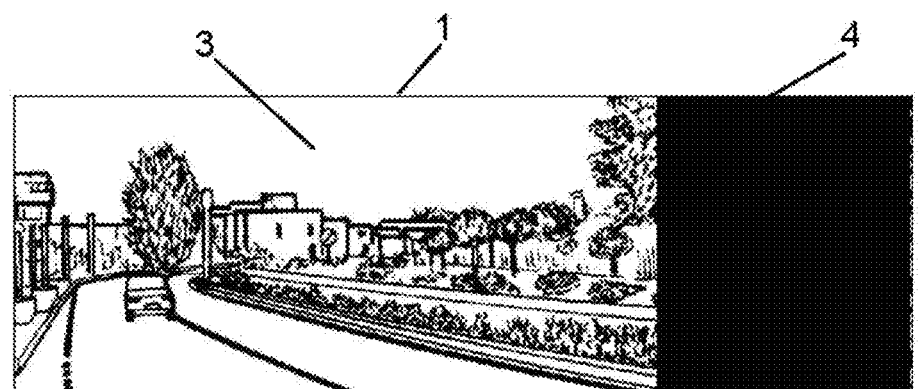
FIG. 2 shows the display unit corresponding to FIG. 1 operating in the second mode, in which the right part of the displayed image has been covered by a black square.

FIGS. 1 to 4 show two embodiments of the vehicle image processing system. FIG. 1 shows a display unit (1) operating in the first mode and displaying an image (2) of the full field of view (FOV) captured by a capturing unit. On the other hand, FIG. 2 shows the display unit (1) of FIG. 1 operating in the second mode and having a first region (3) and a second region (4), wherein the second region (4) is darkened. The configuration of FIG. 2 would be appropriate for side mirrors of a vehicle wherein the pixels of the farthest lateral edge of the digital displayed image (2) are changing very quickly due to an increase of the speed of the vehicle.

The second region (4) is configured to display an area of a neutral color with low bright, for instance, a dark or grey square. In one embodiment, the control unit is configured to send to the display unit (1) the image displayed in the first mode of operation and is also configured to crop the lateral end of said image. Alternatively, the control unit may be configured to turn off the lateral end pixels of the image displayed in the first mode and to send to the display unit (1) said already cut image.

Figure 3:
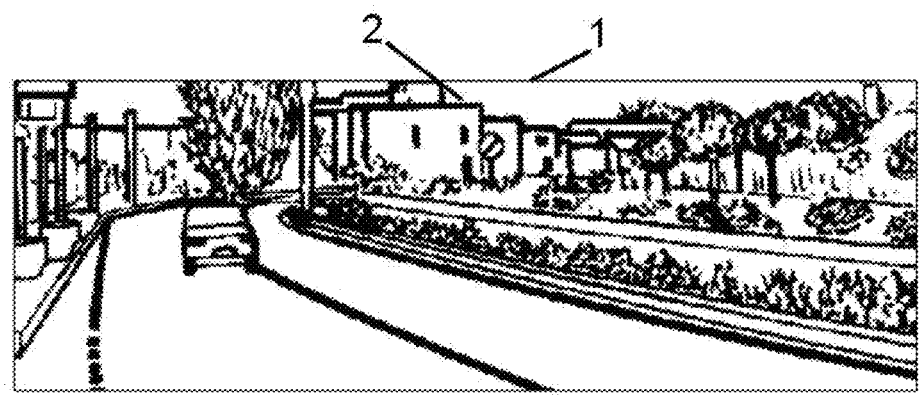
FIG. 3 shows an embodiment of a display unit, specifically an interior mirror, showing an image captured by the capturing unit and operating in the first mode.
Figure 4:
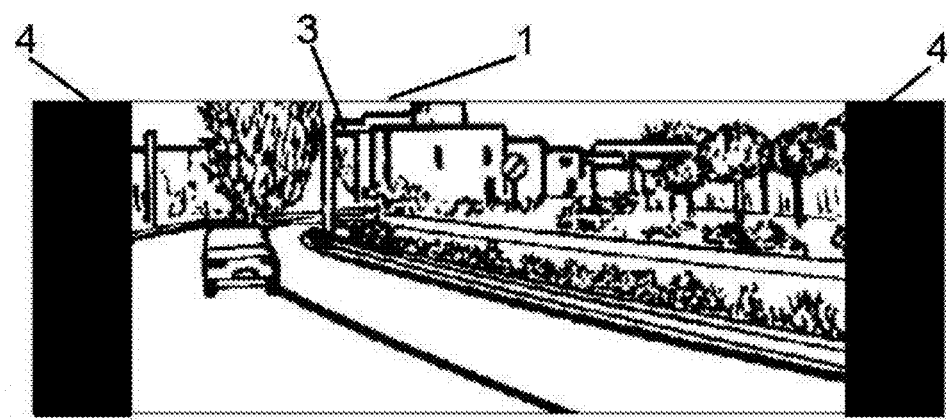
FIG. 4 shows the display unit corresponding to FIG. 2 operating in the second mode, in which the right and the left parts of the displayed image have been covered by a black square.

FIG. 3 shows a display unit (1) operating in the first mode and displaying an image (2) of part of the full field of view (FOV) captured by a capturing unit with a scale different than that of FIG. 1. FIG. 4 shows the display of FIG. 3 operating in the second mode and having a first region (3) and a second region (4), wherein the second region (4) corresponds to the two darkened lateral sides. The configuration of FIG. 4 would be appropriate for interior mirrors of a vehicle wherein the pixels in both farthest lateral edges of the image (2) are changing very quickly due to an increase of the speed of the vehicle.

As it can be observed in the figures, there is no scale change between the first and second operating modes of the display unit in order to prevent causing discomfort to the driver.

The control unit can be configured to receive at least one parameter related to the movement of the vehicle, i.e, the image processing system could have communication with the vehicle to get vehicle data. The control unit would be configured to send a signal to the display unit (1) to change the mode of operation according to the value of the parameter.

Alternatively, the image processing system may comprise an information acquisition unit that acquires information of the vehicle, for example, speed.

According to the above, in an embodiment, if the driver sets up the second display mode in ON, said mode could be activated according to the value of one or more than one parameter, for example, the speed of the vehicle:

If the vehicle exceeds a set up speed, 110 km/h for example, during a predefined period of time, 10 seconds for example, the display switches to the second mode and darkens the corresponding side with an established size of square.

If the vehicle speed drops below a set up speed, 80 km/h for example, during a predefined period of time, 10 seconds for example, the display switches back to the first mode and the darkened squares on the display will be not shown until the vehicle exceeds again the set up activation speed.

The values of speed activation/deactivation, the necessary period of time for activation or deactivation and the size of the square, predefined by the costumer, could be adjustable or not by the driver.

The control unit could be also configured to send a signal to the display unit (1) to increase the size of the second region when the value of the parameter increases, i.e, if the speed increase the size of the black square also increases.

The field of view (FOV) with darkening (second display mode) activated could be set up by the end user or predefined by the original equipment manufacturer (OEM) always according to the applicable standards. The manufacturer of the original equipment (OEM) or end user could decide which information of the vehicle the vehicle image processing system will consider.

In one embodiment, when the vehicle is turning, independently of the speed, the second display mode is deactivated. For example, if a sport mode or track mode is ON, the activation and deactivation of the second display mode could have a different set up than if the driving mode is set up in comfort mode.

In an embodiment, the vehicle image processing system may comprise an image processing unit configured to detect an object in the captured image (2) being the control unit configured to send a signal to the display unit (1) to change to the second mode when an object is detected. Said object could be the road limits, situation in which the vehicle image processing system would darken the region of the displayed image (2) located between the road limits and the edges of the displayed image (2) so only the road is displayed.

Another option is that the control unit (ECU) is configured to measure the frequency of changes in the pixels of the digital image, the control unit being configured to send a signal to the display unit (1) to remove from the displayed image (2) pixels according to the value of its frequency of change. The more quickly the information of a pixel changes, the more disturbing effect for the driver. In one embodiment, the control unit is configured to measure how often the three colors of a pixels varies in a RGB color code.

The field of view (FOV) in the second display mode could vary between the minimum field of view (FOV) according to the applicable standards or other minimum defined by the OEM/end user and the maximum FOV of the system (first display mode).

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

The invention claimed is:

1. A vehicle image processing system for a vehicle comprising:
   a control unit configured to process an image of the exterior environment of the vehicle; and
   a display unit configured to display at least a part of the image processed by the control unit, the control unit being configured to operate the display unit in at least two modes including a first mode where the display unit is configured to display at least a part of the image processed by the control unit, and a second mode where the display unit is configured to display at least first and second adjacent regions, and the second region being located at least in a lateral end of the display unit, and wherein the first region of the display unit is configured to display part of the image processed by the control unit with the same scale of the image displayed in the first mode, and in the second region the display unit is configured to remove the part of the image not displayed in the first region corresponding to the lateral end of the image displayed in the first mode so that at least one lateral end of the displayed image is hidden in the second mode, wherein the display unit is configured to display an area with a neutral color with low bright in the second region of the second mode of operation for removing the at least lateral end of the image displayed in the first mode, and the control unit is configured to receive at least one parameter each having increasing and decreasing values and related to the movement of the vehicle, and wherein the control unit is configured to send a signal to the display unit to change the mode of operation according to a value of the increasing and decreasing values of the parameter.

2. The vehicle image processing system according to claim 1, wherein the neutral color is a dark color.

3. The vehicle image processing system according claim 1, wherein the parameter is the speed of the vehicle such that the control unit is configured to send a signal to the display unit to change the mode of operation according to the value of the speed of the vehicle.

4. The vehicle image processing system, according claim 1, wherein the parameter is the angle of the steering wheel of the vehicle such that the control unit is configured to send a signal to the display unit to change the mode of operation according to the value of the steering wheel.

5. The vehicle image processing system according claim 1, wherein the parameter is the driving mode of the vehicle such that the control unit is configured to send a signal to the display unit to change the mode of operation according to the driving mode of the vehicle.

6. The vehicle image processing system according to claim 1, wherein the control unit is configured to send a signal to the display unit to increase the size of the second region when the value of the parameter increases.

7. The vehicle image processing system according to claim 1, further comprising:
an image processing unit connected to the control unit configured to detect objects in the image processed by the control unit.

8. The vehicle image processing system according to claim 1, wherein the second region comprises at least two lateral ends of the display unit.

9. The vehicle image processing system according to claim 1, further comprising:
a capturing unit connected to the control unit and mountable on the vehicle, the capturing unit being configured to obtain an image of the exterior environment of the vehicle.

10. A vehicle image processing system for a vehicle comprising:
a control unit configured to process an image of the exterior environment of the vehicle;
a display unit configured to display at least a part of the image processed by the control unit, the control unit being configured to operate the display unit in at least two modes including a first mode where the display unit is configured to display at least a part of the image processed by the control unit, and a second mode where the display unit is configured to display at least first and second adjacent regions, and the second region being located at least in a lateral end of the display unit, and where in the first region the display unit is configured to display part of the image processed by the control unit with the same scale of the image displayed in the first mode, and in the second region the display unit is configured to remove the part of the image not displayed in the first region corresponding to the lateral end of the image displayed in the first mode so that at least one lateral end of the displayed image is hidden in the second mode; and
an image processing unit connected to the control unit configured to detect objects in the image processed by the control unit.

11. The vehicle image processing system, according to claim 10, wherein the image processing unit is configured to detect the lateral limits of a road in the processed image and the control unit is configured to send a signal to the display unit to change to the second mode of operation where the display unit is configured to remove from the displayed image a second region located between the road limits and the edges of the displayed image.

12. The vehicle image processing system according to claim 11, wherein the display unit is configured to display a dark area located between the road limits and the edges of the display unit.

13. The vehicle image processing system according to claim 12, wherein the displayed image is a digital image and the control unit is configured to measure the frequency of changes in pixels of the digital image and where the control unit is configured to send a signal to the display unit to remove from the displayed image pixels according to the value of its frequency of change.

14. A vehicle image processing system for a vehicle comprising:
a control unit configured to process an image of the exterior environment of the vehicle; and
a display unit configured to display at least a part of the image processed by the control unit, the control unit being configured to operate the display unit in at least two modes including a first mode where the display unit is configured to display at least a part of the image processed by the control unit, and a second mode where the display unit is configured to display at least first and second adjacent regions, and the second region being located at least in a lateral end of the display unit, and wherein the first region of the display unit is configured to display part of the image processed by the control unit with the same scale of the image displayed in the first mode, and in the second region the display unit is configured to remove the part of the image not displayed in the first region corresponding to the lateral end of the image displayed in the first mode so that at least one lateral end of the displayed image is hidden in the second mode, wherein the displayed image is a digital image and the control unit is configured to measure the frequency of changes in pixels of the digital image and where the control unit is configured to send a signal to the display unit to remove from the displayed image pixels according to the value of its frequency of change.

\* \* \* \* \*